CALLING STATION IDENTIFICATION

Filed June 29, 1956 3 Sheets-Sheet 1

INVENTORS
RAYMOND C. P. HINTON
BORIS DZULA
BY [signature]
ATTORNEY

CALLING STATION IDENTIFICATION

Filed June 29, 1956 3 Sheets-Sheet 2

INVENTORS
RAYMOND C. P. HINTON
BORIS DZULA
BY Lucy P. Lantz
ATTORNEY

July 7, 1959 R. C. P. HINTON ET AL 2,894,069

CALLING STATION IDENTIFICATION

Filed June 29, 1956 3 Sheets-Sheet 3

INVENTORS
RAYMOND C.P. HINTON
BORIS DZULA

BY

ATTORNEY

United States Patent Office 2,894,069

Patented July 7, 1959

2,894,069

CALLING STATION IDENTIFICATION

Raymond C. P. Hinton, Teaneck, and Boris Dzula, Clifton, N.J., assignors to International Telephone and Telegraph Corporation, Nutley, N.J., a corporation of Maryland Application June 29, 1956, Serial No. 594,756

8 Claims. (Cl. 179—8.5)

This invention relates to automatic message recording systems and is directed particularly to the identification of calling lines in combination with special guard and failure release circuits.

One of the objects of this invention is to provide an improved automatic message recording system wherein the identity of a calling station, either private or party, is recorded only when a call is properly initiated by the seizure of a trunk connection and the identity designation of the calling line is established. Another object is to provide in such a system a guard circuit which will insure against improper recording, such as when booster battery potential is applied to a private or party line for registering local calls. Still another object is to provide a failure release circuit in such a system which prevents the trunk junction hunter from being tied up beyond a predetermined period by an unsuccessful or faulty connection.

The above mentioned and other objects of this invention will become more apparent by reference to the following description taken in conjunction with the accompanying drawings, wherein.

Figure 1:
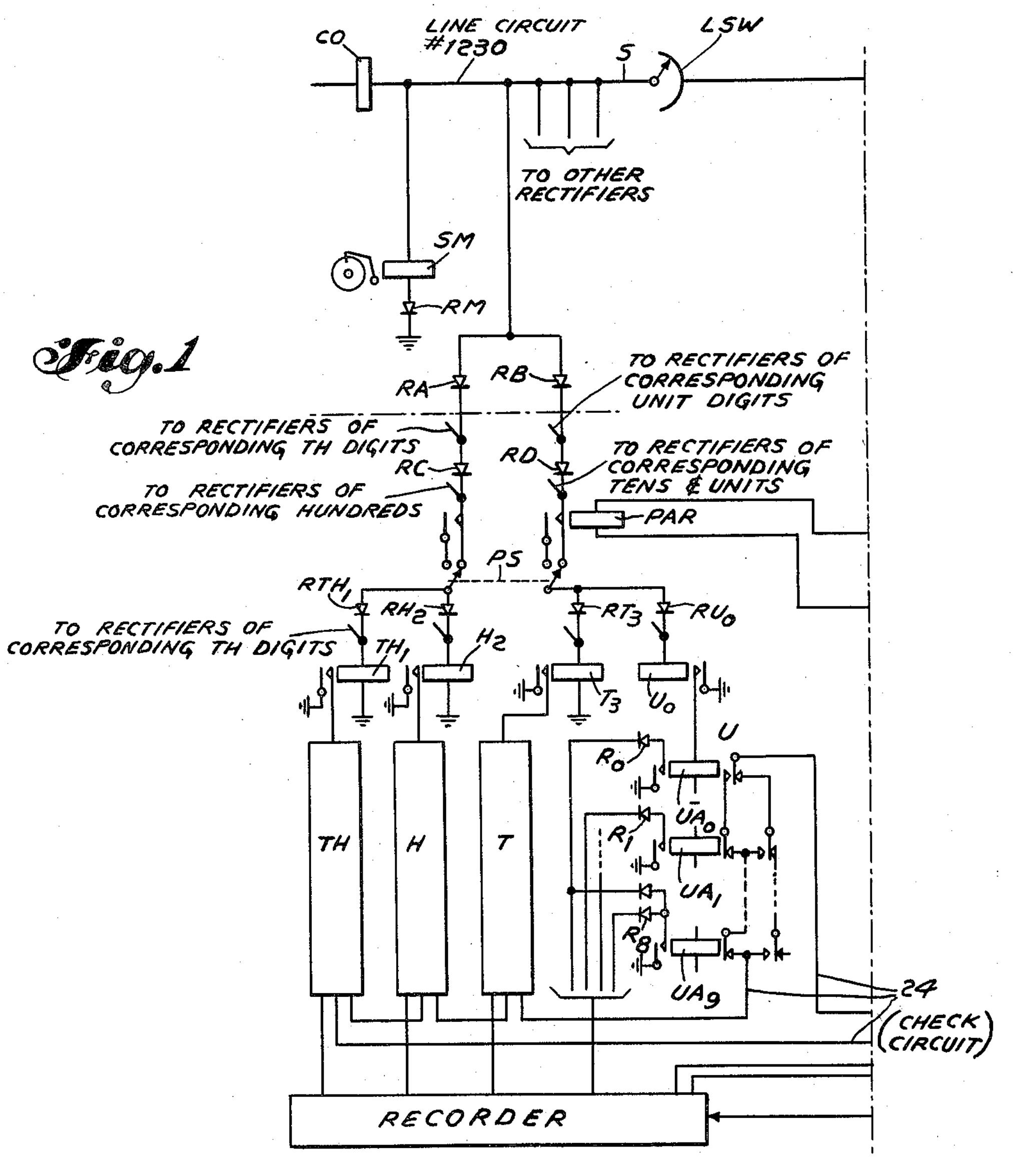
Fig. 1 shows a relevant portion of a line circuit having line or station identifying equipment, whereby a simultaneous registration of the values of the digits of all denominations of a line or station designation is obtained.
Figure 4:
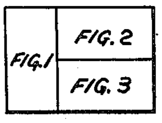
Fig. 4 shows how the above figures should be placed in relation to one another.
Figure 3:
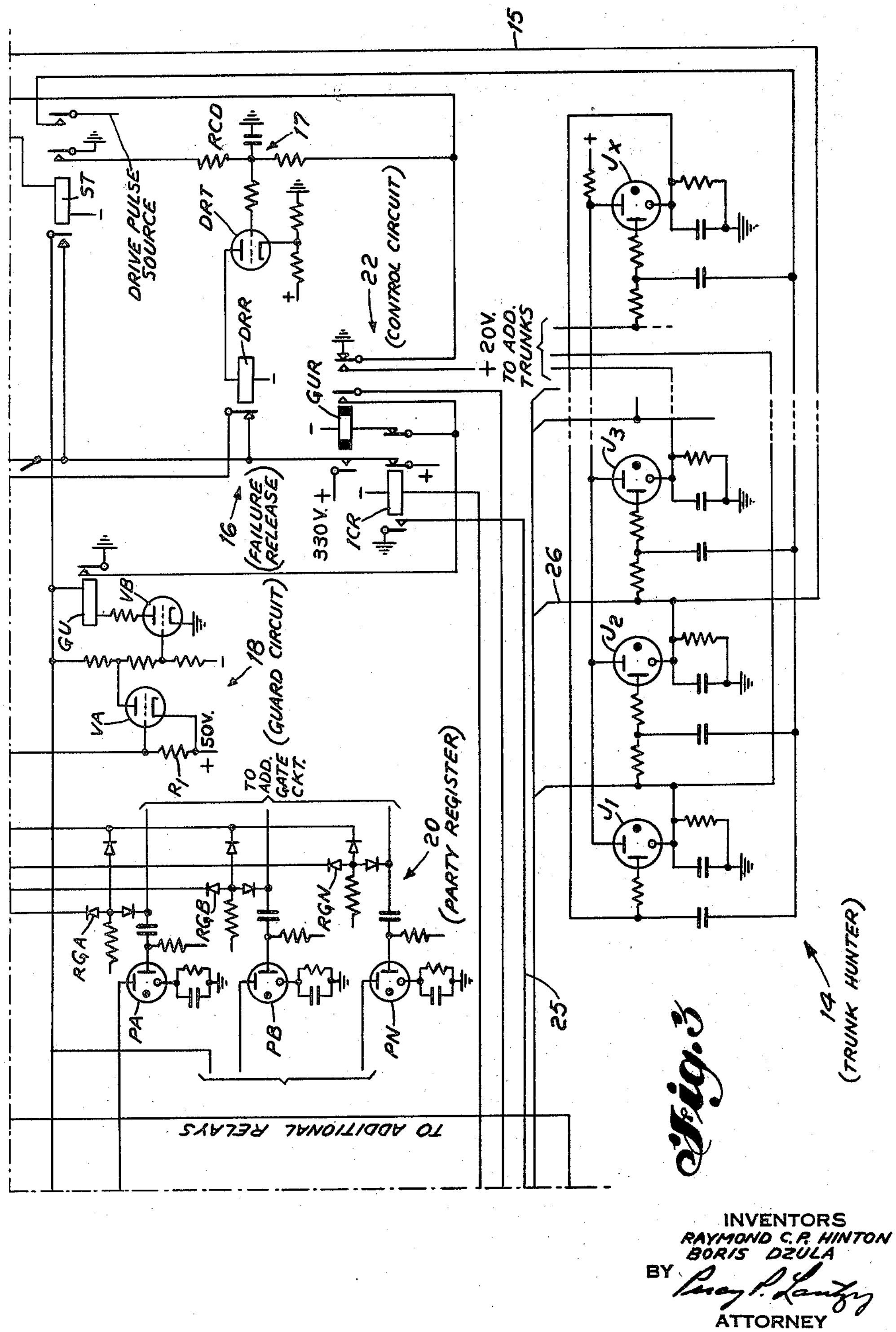
Fig. 3 shows control equipment common to the outgoing trunk repeaters and which includes a guard circuit, a release circuit, a party line register, and a trunk hunter.

Referring to the drawings, Fig. 1 shows a line circuit coupled to its respective service meter SM and cut-off relay CO, and to the identifying circuit in accordance with the line identity designation, which, for example, may comprise directory number "1230." The identifying circuit is in turn shown coupled to a recorder adapted to record the directory number when the recording operation is initiated by the control circuit of Fig. 3. The line circuit illustrated is shown coupled to the wipers of the line switch LSW and from there to succeeding switching stages including the final selector F. Sel. The line circuit is connected on the one side through rectifiers RA, RC to the thousands and hundreds rectifiers $RTH_1$ and $RH_2$ and on the other side through rectifiers RB, RD to the tens and units rectifiers $RT_3$ and $RU_0$. The rectifier $RTH_1$ controls the relay $TH_1$ while $RH_2$ controls relay $H_2$, $RT_3$ controls relay $T_3$ and $RU_0$ controls relay $U_0$. These relays are coupled to the appropriate relays in the banks illustrated for the purpose of establishing the digital designation of the line directory number when an identifying potential is applied to the line. As shown for the units bank the relay $U_0$ is coupled to the relay $UA_0$. On the right hand side of the relay $UA_0$ are the contacts for checking the establishment of the units digit of the directory number. Should no relay or more than one relay be energized in the units bank then the check circuit would be open and a faulty connection would be thereby indicated. This check circuit is continued in series throughout the tens, hundreds and thousands banks. The contacts to the left hand side of the units relays are connected directly to the recorder and when a recording operation is initiated this units information along with the higher digital information of the other banks is recorded. The identifying circuit thus described is shown connected for a private line. Should a party line coupling be applied to the circuit the contacts of relay PAR are made effective by changing the switch contacts PS to the left. An example in more detail of one form of identifying circuit that may be employed in the present invention is disclosed in the U.S. patent to L. B. Haigh No. 2,338,242.

Figure 2:
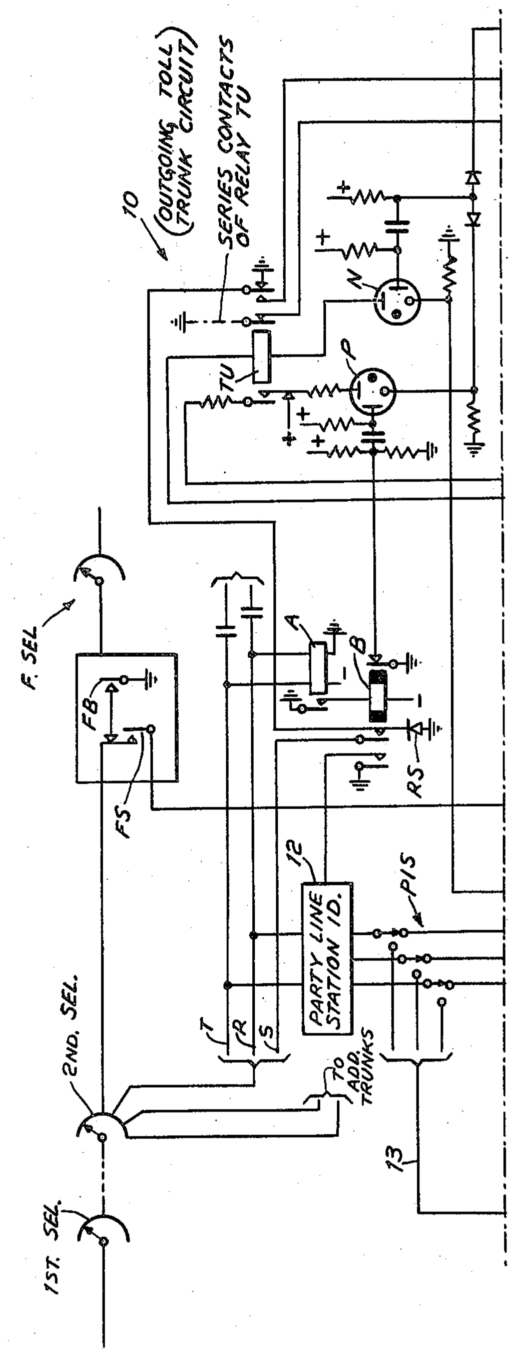
Fig. 2 shows relevant portions of an automatic telephone exchange including one of the outgoing trunk repeaters and part of the party line identifying equipment.

Fig. 2 shows the line circuit coupled through portions of a known automatic telephone system such as 1st, 2nd and final selectors. Local and short distance connections may be metered by 50 v. booster battery, by means of contacts FB and FS in known manner. In telephone connections requiring identification of the calling line, such as long distance calls, the connections are usually routed through one of the preceding selectors, and an outgoing trunk circuit whence it is extended to its destination by well-known means. When a trunk such as indicated at 10 is seized the identification circuit is automatically connected to the trunk and proceeds with its operation of determining the number of the calling station.

Fig. 2 further shows a "party line station identification circuit" 12 which is connected to the tip, and ring conductors I and R of the trunk. While this circuit is preferably of the type disclosed in copending application of W. Hatton, Serial No. 451,791, filed on August 24, 1954, other known party line identifying means may be employed. Its purpose is to determine which of the stations on the party line that has originated the call. For example, in the manner set forth in the above-identified application, the identity of the calling station is stored until it may be transferred to a common party register for identifying the directory number.

Referring to Fig. 3, this drawing shows a portion of the common control equipment of the identification circuit. This equipment is used in common by a group of trunks and, in its operation, is used only by one trunk at a time, a short interval being provided during which other trunks await their turn for connection therewith to obtain similar identification service. The common equipment is connected to the trunks by means of a junction for seized trunk detector 14 comprising a gas tube ring counter where each tube is assigned to a different trunk circuit. The gas tube $J_2$, for example, is coupled through circuit 15 to the tube N of the trunk circuit 10.

The common equipment of Fig. 3 includes a failure release circuit 16 to prevent the identification equipment being locked to a particular call beyond a predetermined period. The circuit 16 comprises a triode DRT feed via a resistance-condenser network 17 having a predetermined time constant. When identification is not completed within a given time period, relay DRR is operated thereby releasing the identification circuit permitting the seized trunk detector to resume hunting for a seized trunk.

The common equipment of Fig. 3 also includes a guard circuit 18 comprising two triodes VA, VB and a relay GU. The circuit is a current sensing device which operates to prevent interference between the metering booster battery and the identification service.

The common equipment of Fig. 3 further includes a party register 20 comprising a number of gas tubes PA, PB and PN, corresponding to the highest number of stations connected to any party line. Each tube is connected to a rectifier gate per trunk circuit. During identification, the party register is connected via the rectifier gates, to the trunk circuit over which identification takes place. The station identification circuit 12 transmits the identity of the calling station to the party register 20, which, in turn, prepares the equipment for identification of the calling station.

A control circuit 22 comprises relays GUR and ICR. Relay GUR initiates the identification operation. Relay ICR operates when the identification is successfully completed, thereby causing the recorder to register the number of the calling line. Relay ICR further causes the operated apparatus to release which, in turn, permits the seized trunk detector to resume hunting for a seized trunk.

Having described in a general way the structure of the component elements of the invention and the manner in which they cooperate to identify and record the directory number of a calling telephone station, we will now describe the detailed operation of the invention in connection with the identification and recording of the directory number "1230" when a call is placed from such station.

In the description which follows, it is to be understood that some connections, such as local and short distance connections, are metered by a 50 v. booster metering potential in a well known manner and that in the case of other connections, such as long distance connections, it is required to record automatically the identity of a line making a connection. For the sake of simplicity it is assumed that all connections to be booster metered are extended over a circuit such as the final selector circuit F. Sel., Fig. 2, and that connections requiring an automatic record of the identity of the calling line are extended from the trunk circuit seized by the calling line.

Each line circuit is arranged as indicated in Fig. 1 for line No. 1230 with its cut-off relay CO and its message register SM connected to the sleeve conductor S which, when a call is set up via the line switch LSW and first and second selectors 1st and 2nd Sel., Fig. 2, to a final selector F. Sel. or to an outgoing trunk circuit, is earthed by a contact FB of relay FB (not shown) in the final selector or via contacts of relay B and the rectifier RS in the trunk circuit. The relay CO, which is connected to a negative battery and is operated when the connection is extended through the line switch LSW, remains operated, but the service meter SM, which is connected via a rectifier RM to ground, is not operated at this time.

Turning now to Fig. 2, the seizure of a trunk circuit results in the operation of the line relay A which in turn operates the guard relay B. The relay B connects ground to the sleeve conductor and applies a pulse to the control electrode of gas tube P which causes the tube to fire and to change the potential at the control electrode of gas tube N, thereby recording a request for line identification.

In order that the trunk circuits may be serviced one at a time, the seized trunk detector 14 tests each trunk line in turn, and when it tests one seized, the seized trunk detector is in turn seized and an identification operation is initiated. The seized trunk detector comprises a number of gas tubes JI to JX, one for each trunk, arranged in the form of a well known cyclic counter. The cathodes of JI to JX are connected through suitable rectifiers to a control electrode of a tube N of a corresponding trunk circuit such as illustrated for cathode $J_2$.

The identification of a line circuit connected to an outgoing trunk circuit is made in the following manner. The seized trunk detector is normally stepped by means of drive pulses supplied via front contacts of relay ST (Fig. 3) operated in the normal position over the back contacts of all TU relays connected in series (Fig. 2). When the seized trunk detector reaches a seized trunk line such as 10, the P tube of which is fired, the coincidence of the two potentials from the P tube and from the corresponding counter tube ($J_2$) causes tube N to fire. A circuit is now completed for relay TU via the anode of tube N and the contacts of relays DRR and ICR (Fig. 3). Relay TU operates thereby opening the circuit for relay ST which releases and in turn opens the circuit for the drive pulses. Provided no booster metering takes place, relay ST completes a circuit for relay GU (Fig. 3) via tube VB and contacts of relays ST, DRR and ICR. Relay GU operates and in turn operates relay GUR. Relay GUR applies a 20 v. positive potential to the sleeve conductor of the calling line circuit. This circuit may be traced via contacts of relays GUR, TU, B and the sleeve conductors of 2nd and 1st selectors and the line switch LSW. The seized trunk detector sends the seized trunk identity over circuit 26 to the recorder.

At the line circuit, Fig. 1, the positive 20 v. passes through the appropriate rectifiers and relays, as previously explained, thereby operating relays $TH_1$, $H_2$, $T_3$, $H_0$ and associated helping relays. The calling line identity is now checked; i.e., if one and only one helping relay is operated in each decade of digits, a circuit 24 is completed for relay ICR, Fig. 3, via contacts of the helping relays and relays GUR and GU. Relay ICR operates and connects, via its front contact, a start signal over circuit 25 to the recorder causing the recorder to register the identity of the calling line. These records may be produced on a magnetic drum, tape or other known media. The decimal designation of the line may, if desired, be translated into a binary code via a set of rectifiers represented by $R_0$, $R_1$, . . . $R_8$.

Relay ICR operated opens the circuit for relay GUR. After a certain time, sufficient to record the identity of the calling line, relay GUR releases, thereby disconnecting the positive 20 v. identifying signal from the sleeve conductor of the connection which, in turn, releases all relays in Fig. 1. Relay GUR also extinguishes tubes P and N in the trunk and releases relays TU and ICR. Relay ST, operated via the back contacts of all TU relays, connects the drive pulses to the trunk hunter which resumes hunting.

When the calling party is a station of a party line, the identity (but not the directory number) of the station is registered in the station identification circuit 12 of the trunk, Fig. 2, causing a potential to be applied to one of the rectifier gates RGA, RGB or RGN. Assume that station A is calling and a potential is applied to gate RGA. When the seized trunk detector is seized, the trunk tube N is fired, as previously explained, thereby causing a pulse to be transmitted via the cathode of tube N, gate RGA, to the control electrode of gas tube PA which fires. A circuit is now completed for relay PAR via the anode of tube PA, winding PAR and contacts of relays ST, DRR, ICR to positive battery. Contacts PS of the identification circuit for party line identification are held in their left hand position. Relay PAR operates and connects the individual station rectifiers RA and RB of all party stations A to the common rectifiers RTH, RH and RT, RU, respectively. Identification of the party line directory number of the calling station will now proceed in the same manner as for identification of a calling line. When identification is completed, relay GUR releases, thereby extinguishing tube PA and releasing relay PAR. The station identification circuit will be released at the completion of the call when guard relay B releases.

In some installations it may be desirable to pass directly to the recorder the identity of a calling station of a party line. In such installations this is done by connecting party identifying switch PIS to recording circuit 13.

When identification cannot be completed within a predetermined time, for one reason or another, part of the circuit is released, thereby permitting the seized trunk detector to resume hunting for seized trunks requesting identification. The circuit operation takes place as follows. When the positive 20 v. identification signal is connected to the sleeve conductor of the connection by means of relay GUR, it is also fed to the grid of triode DRT via a resistor condenser network RCD having a predetermined time constant. If the identification signal remains connected for a given time, the grid potential of triode DRT becomes sufficiently positive to operate relay DRR, connected to the plate circuit. Relay DRR opens the circuit for tube N and relay TU, thereby closing the circuit for relay ST. Energization of the ST relay, in turn, connects the drive pulses to the trunk hunter which resumes hunting for other seized trunks. When the seized trunk detector returns to this trunk, the tube P being energized, causes tube N to be energized and another attempt to effect identification is made. If identification is successful, the identification signal is completed before relay DRR can operate. The condenser of network RCD is discharged via the front contacts of relays ST and GUR in order to maintain a constant timing for all calls.

A guard circuit comprising triodes VA, VB and relay GU is provided to prevent metering booster battery from interfering with identification. The circuit is a D.C. amplifier which acts as a sensitive current indicating device to release or prevent the operation of relay GUR. When metering takes place simultaneously with identification, current through resistor $R_1$ causes VA to conduct which, in turn, cuts off VB and releases relays GU, GUR and ICR if operated. Relay GUR disconnects the +20 v. identification signal from the sleeve conductor of the connection, thereby releasing relays TH, H, T, U and associated helping relays. ICR releases the recorder, thereby preventing the metering signal from being recorded. Relay ICR also connects +330 v. to tubes P and N, thereby maintaining these tubes conductive. When metering is terminated, relay GU operates and identification is then initiated.

If metering is in progress at the time identification is started, tube VA becomes conductive when relay ST releases, VB is cut off and relay GU cannot operate; consequently, identification cannot take place. When metering is terminated, relay GU operates and identification is initiated.

While we have described above the principles of our invention in connection with specific apparatus, it is to be clearly understood that this description is made only by way of example and not as a limitation to the scope of our invention as set forth in the objects thereof and in the accompanying claims.

We claim:

1. In an automatic message recording system having a recorder for recording the identity designation of a calling line that has seized a trunk line to make a call; an identifying circuit coupled to said calling line in accordance with the identity designation thereof, a plurality of trunk lines, a seized trunk detector adapted to test said trunk lines successively for detecting a trunk line which has been seized by a calling line, a release circuit having a predetermined timing period, a control circuit activated upon seizure detection by said seized trunk detector to apply an identification potential to said calling line for application to said identifying circuit and to said release circuit to initiate the timing period thereof, said control circuit having means to check the condition of said identifying circuit and when a satisfactory check is obtained to apply the identity designation thereon to said recorder and means responsive to said release circuit to deactivate said control circuit upon termination of said predetermined time period.

2. In an automatic message recording system having a recorder for recording the identity designation of a calling line that has seized a trunk line to make a call; an identifying circuit coupled to said calling line in accordance with the identity designation thereof, a plurality of trunk lines, a seized trunk detector adapted to test for seizure of said trunk lines, each trunk line having means conditionable upon seizure by a calling line to be conditioned by said seized trunk detector when said seized trunk detector tests a seized trunk line, a release circuit having a predetermined timing period, a control circuit responsive to said trunk line conditioning to apply an identification potential to said calling line for application to said identifying circuit and to said release circuit to initiate the timing period thereof, said control circuit having means to check the condition of said identifying circuit and when a satisfactory check is obtained to apply the identity designation thereon to said recorder, and means responsive to said release circuit to release said seized trunk detector upon termination of said predetermined time period.

3. In an automatic message recording system having a recorder for recording the identity designation of a calling line that has seized a trunk line to make a call; an identifying circuit coupled to said calling line in accordance with the identity designation thereof, a plurality of trunk lines, a trunk hunter adapted to test for seizure of said trunk lines, each trunk line having means conditionable upon seizure by a calling line to be conditioned by said seized trunk detector when said seized trunk detector tests a seized trunk line, a release circuit having a predetermined timing period, a control circuit responsive to said trunk line conditioning to apply an identification potential to said calling line for application to said identifying circuit and to said release circuit to initiate the timing period thereof, said seized trunk detector having a means to apply the identity of the trunk line that is detected to said recorder, said control circuit having means to check the condition of said identifying circuit and if a satisfactory check is obtained within said time period to apply the identity designation thereon to said recorder and to release said seized trunk detector, and means responsive to said release circuit to deactivate said control circuit and release said seized trunk detector if not released upon termination of said predetermined time period.

4. In an automatic message recording system having a recorder for recording the identity of a calling line that has seized a trunk line to make a call; a plurality of trunk lines, a seized trunk detector adapted to test for seizure of said trunk lines, each trunk line having means conditionable upon seizure by a calling line to be conditioned by said seized trunk detector when said seized trunk detector tests for seizure of said trunk line, a release circuit having a predetermined timing period, a control circuit activated by said trunk line conditioning, means controlled by said control circuit to initiate the timing period of said release circuit and to apply the identification of the calling line to said recorder and means responsive to said release circuit to deactivate said control circuit upon termination of said predetermined time period.

5. In an automatic message recording system having a recorder for recording the identity designation of a calling party line that has seized a trunk line to make a call; an identifying circuit coupled to said party line in accordance with the identity designation thereof, a plurality of trunk lines, a seized trunk detector adapted to test for seizure of said trunk lines, each trunk line having means conditionable upon seizure thereof to be conditioned by said seized trunk detector when said seized trunk detector tests for seizure of said trunk line, a party line identification circuit energizable upon seizure of a trunk line to apply the identity of the party to said party line identifying circuit, a control circuit responsive to said trunk line conditioning to apply an identification potential to said party line for application to said identifying circuit, said control circuit having means to check the condition of said identifying circuit and when satisfactory to apply the identity designation thereon to said recorder, and means responsive to initiation of a recording operation to release said seized trunk detector upon elapse of a predetermined time.

6. In an automatic message recording system having a recorder for recording the identity designation of a calling line that has seized a trunk line to make a call; a calling line identifying circuit having means responsive to an identification potential to establish identification designation of the calling line, a service meter coupled to said calling line, means responsive to completion of a local call to apply a metering potential to said calling line to operate said service meter, said identification potential being inadequate to operate said service meter but said metering potential being sufficiently high to operate both said service meter and said identifying circuit, a seized trunk detector adapted to test for seizure of a trunk line, each trunk line having means conditionable upon seizure by a calling line to be conditioned by said seized trunk detector when said seized trunk detector tests for seizure of said trunk line, a control circuit responsive to said trunk line conditioning to apply an identification potential to said calling line for application of its identification designation onto said identifying circuit, a guard circuit responsive to application of said metering potential during a call line identification operation to deactivate said control circuit and to release said seized trunk detector, said control circuit having means to effect operation of the recorder to record the identity designation represented by the condition of said identification circuit and to release said seized trunk detector for a predetermined period after completion of an initiated recorder operation.

7. An automatic message recording system according to claim 6 wherein said guard circuit includes a holding relay energizable by said control circuit to maintain said control circuit activated, and means responsive to application of said metering potential to deenergize said holding relay and thereby deactivate said control circuit.

8. In an automatic message recording system having a recorder for recording the identity designation of a calling line that has seized a trunk line to make a call; a calling line identifying circuit having means responsive to an identification potential to establish identification designation of the calling line, a service meter coupled to said calling line, means responsive to completion of a local call to apply a metering potential to said calling line to operate said service meter, said identification potential being inadequate to operate said service meter but said metering potential being sufficiently high to operate both said service meter and said identifying circuit, a plurality of trunk lines, a seized trunk detector adapted to test for seizure of said trunk lines, each trunk line having means conditionable upon seizure by a calling line to be conditioned by said seized trunk detector when said seized trunk detector tests for seizure of said trunk line, a failure release circuit having a predetermined timing period, a control circuit responsive to said trunk conditioning to apply an identification potential to said calling line for application of its identification designation onto said identifying circuit and to initiate operation of said failure release circuit, a guard circuit responsive to application of said metering potential during a call line identification operation to deactivate said control circuit and to release said seized trunk detector, said control circuit having means to check the condition of said identifying circuit, means responsive to a satisfactory check of said identifying circuit to effect operation of the recorder to record the identity designation represented by the condition of said identification circuit and to deactivate said control circuit and release said trunk hunter, and means responsive to said release circuit to deactivate said control circuit and release said seized trunk detector should said recording operation not occur prior to termination of said predetermined timing period.

References Cited in the file of this patent

UNITED STATES PATENTS

| | | |
|---|---|---|
| 2,297,365 | Ostline | Sept. 29, 1942 |
| 2,352,492 | Ostline | June 27, 1944 |
| 2,504,708 | Long | Apr. 18, 1950 |
| 2,603,713 | Ostline | July 15, 1952 |